Jan. 17, 1967  J. B. DAY  3,298,476

DISC BRAKE ROTOR

Filed Aug. 13, 1965

INVENTOR.
JOHN B. DAY
BY
John B. Sowell
ATTORNEY

Jan. 17, 1967     J. B. DAY     3,298,476
DISC BRAKE ROTOR
Filed Aug. 13, 1965     2 Sheets-Sheet 2
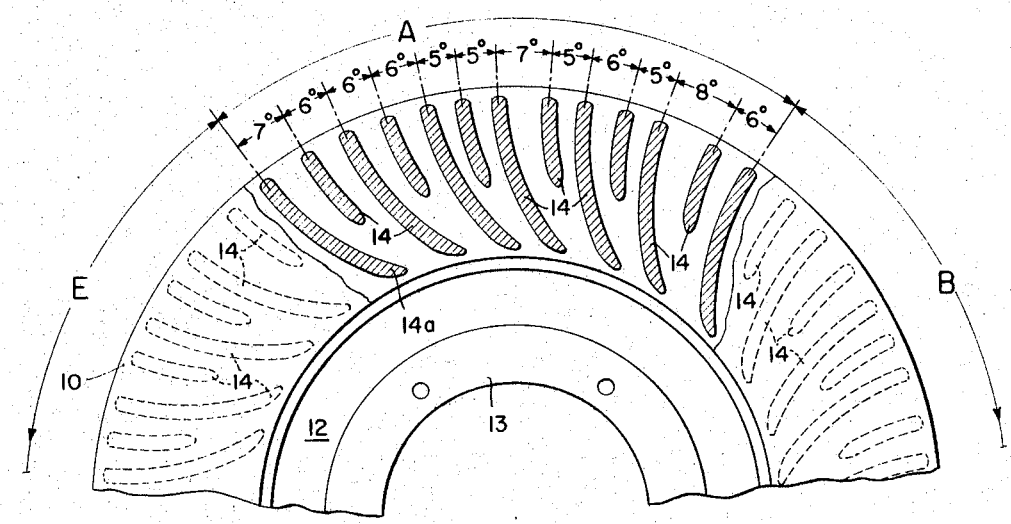
_Fig. 4_
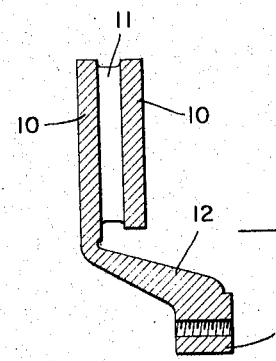
_Fig. 3_
INVENTOR.
JOHN B. DAY
BY
John B. Sowell
ATTORNEY United States Patent Office 3,298,476
Patented Jan. 17, 1967

3,298,476
DISC BRAKE ROTOR
John B. Day, Columbus, Ohio, assignor, by mesne assignments, to The Budd Company, Philadelphia, Pa., a corporation of Pennsylvania
Filed Aug. 13, 1965, Ser. No. 479,377
8 Claims. (Cl. 188—218)

This invention relates to rotors for disc brakes, particularly rotors of the ventilated type.

One type of a conventional ventilated disc brake rotor embodies a pair of axially spaced annular friction plates interconnected by a plurality of radial, air impelling vanes or blades which are uniformly spaced apart. In such a rotor there is a tendency in some instances when braking pressure is applied by the friction pads to the opposite faces of the rotor to develop a squeal. "Squeal" is a high pitched noise occurring during normal braking, usually at light braking pressures.

As a result of tests run with disc brake rotors of the above type, it is believed that the objectionable squeal is the result of vibration of the entire brake disc in response to the exciting forces generated between the disc and the friction pads, and that the high pitched noise is a regenerative phenomenon in which the vibration, once induced under proper conditions by the friction pads, is self-sustaining. It would appear that since there is a relatively large number of blades, uniformly spaced apart, the response of the disc is essentially independent of the circumferential location of the exciting forces and that because of this there is, under certain braking conditions, a build-up of this high intensity sound which produces the squeal. I have confirmed this by running tests under similar conditions on the same type of disc rotor in which the blades were removed from the rotor at semi-random locations whereby the blades were non-uniformly spaced apart throughout the circumferential extent of the friction plates. I found in these latter tests that the change in vibration response of the disc varied significantly as a function of the circumferential location of the exciting forces. This varying response was sufficient to prevent the build-up of the high intensity regenerative sound when the point of excitation varied continuously as it does in an operating brake.

Accordingly, it is the primary object of the present invention to provide a disc brake rotor of such design and construction as to prevent or eliminate objectionable squeal under normal braking conditions.

A further object is to provide a bladed disc brake rotor in which the spacing of the air-impelling blades is randomized.

A still further object is to provide a bladed disc brake rotor with a plurality of consecutive series of blades in which the blades of each series have a randomized spacing according to a predetermined pattern and in which the predetermined pattern is the same for each series of blades.

These being among the objects of the present invention, the same comprises certain features of construction to be hereinafter described with reference to the accompanying drawings, and then claimed, having the above and other objects in view.

In the accompanying drawings which illustrate suitable embodiments of the present invention, FIG. 1 is a side view of a disc brake rotor with a portion of the friction plate broken away to show the randomized spacing of the rotor blades;

FIG. 3 is a transverse section of the rotor taken on the line 3—3 of FIG. 1; and FIG. 4 is a fragmentary side view of a modified type of rotor with a portion of a friction plate broken away to show air-impelling blades of curved formation.

Figure 1:
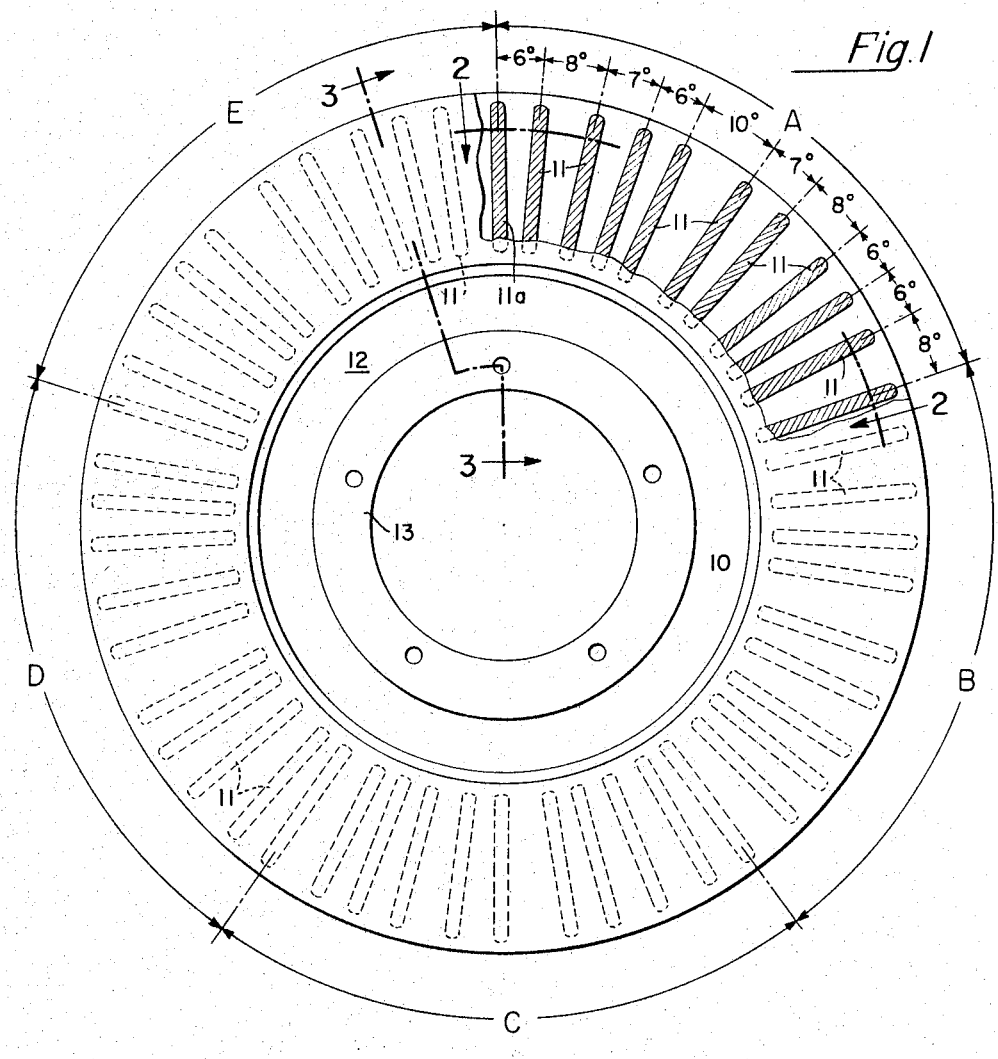
Figure 2:
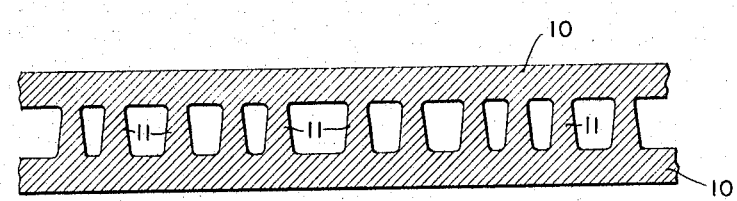
FIG. 2 is a transverse section of the rotor taken on the line 2—2 of FIG. 1.

Referring to the accompanying drawings in which like numerals refer to like parts throughout the several views, the disc brake rotor shown for illustration in FIGS. 1, 2 and 3 is of integral construction. It comprises a pair of axially spaced, annular friction plates 10 which are integrally connected by a plurality of radial air-impelling vanes or blades 11.

As can be seen in FIG. 3, one of the friction plates 10 is provided at its inner periphery with an integral annular extension 12 which terminates in an annular hub portion 13 which serves as a means for attachment of the rotor to a rotary element (not shown) to be braked.

As seen in FIG. 1 and 2 the spacing between the blades 11 is non-uniform. In the claims the term "randomized" is used to indicate non-uniform spacing of the rotor blades.

In order to have proper balance of the rotor, the rotor is divided into a number of sectors, preferably an odd number, each sector containing a series of blades 11. For the purposes of illustration the rotor shown is divided into five sectors, A, B, C, D and E, each containing eleven blades. The series of blades in sector A have the following spacing pattern (blade axis to blade axis), starting with blade 11a: 6°, 8°, 7°, 6°, 10°, 7°, 8°, 6°, 6°, 8°. In order to achieve proper balance of the rotor, the series of blades 11 in each of sectors B, C, D and E have this identical randomized spacing pattern.

In the modified construction of FIG. 4, thirteen blades 14 are shown in sector A. As here shown the blades 14 are of curved or arcuate formation with every other blade being of shorter length. Curved blades provide for air flow of a different characteristic than truly radial blades.

Starting with blade 14a in segment A of FIG. 4 the randomized spacing shown for the purposes of illustration is 7°, 6°, 6°, 6°, 5°, 5°, 7°, 5°, 6°, 5°, 8°, 6°. As in the case of the rotor shown in FIG. 1, this randomized spacing pattern is repeated for the other segments of the rotor.

The randomized spacing patterns shown in FIGS. 1 and 4 are for the purposes of illustrations only and it is to be understood that other patterns may be used, so long as there is non-uniform spacing in each sector.

In both examples shown and described above, the randomized spacing of the air-impelling blades provides means whereby during application of braking pressure the frequency response of the disc will vary sufficiently as the point of excitation on the disc moves relative to the disc, thereby preventing or minimizing the tendency toward a build-up of high intensity of sound to thus eliminate brake squeal.

It should be understood that the configuration utilizing similar segments within which the spacing is randomized is only a special case of the general idea of randomized blade locations which is particularly suitable for ease of balancing in manufacturing.

Formal changes may be made in the embodiments of the invention shown and described without departing from the spirit and substance of the broad invention, the scope of which is commensurate with the appended claims.

What I claim is:

1. A disc brake rotor comprising a pair of axially spaced annular friction plates, and a plurality of circumferentially spaced blades interconnecting said friction plates, the circumferential spacing between said blades being randomized in series of three or more blades.

2. A disc brake rotor according to claim 1 in which the blades are arranged in a plurality of consecutive series of the same number of blades each, the randomized spacing of the blades of each series being of a predetermined pattern, and said pattern for one series being identical with the pattern of the other series.

3. A disc brake rotor according to claim 1 in which said blades extend radially, each in a straight line path.

4. A disc brake rotor according to claim 1 in which said blades, generally radial, extend in a curved path.

5. A disc brake rotor according to claim 2 in which said blades extend radially, each in a straight line path.

6. A disc brake rotor according to claim 2 in which said blades extend generally radially in a curved path.

7. A disc brake rotor as claimed in claim 2 in which an odd number of series are equally spaced circumferentially about said rotor.

8. A disc brake rotor comprising a pair of axially spaced annular friction plates, a plurality of circumferentially spaced blades interconnecting said friction plates, the spacing of said blades being one from another in non-repetitive patterns of three or more blades and said patterns being spaced one from another in repetitive series.

References Cited by the Examiner

UNITED STATES PATENTS 2,411,067  11/1946  Tack _____ 188—218

FOREIGN PATENTS 1,038,593  9/1958  Germany.

MILTON BUCHLER, *Primary Examiner.*

FERGUS S. MIDDLETON, *Examiner.*

G. E. A. HALVOSA, *Assistant Examiner.*